No. 657,790. Patented Sept. 11, 1900.
F. A. ROSS.
ROLLER SKATE.
(Application filed Oct. 29, 1898.)
(No Model.)
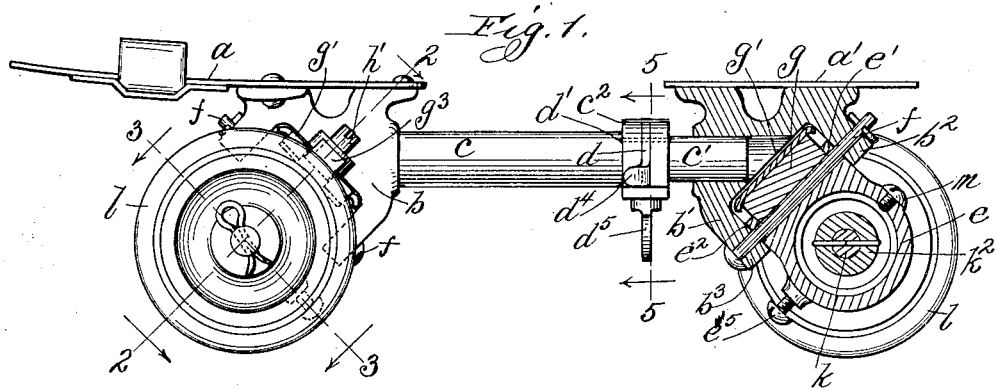
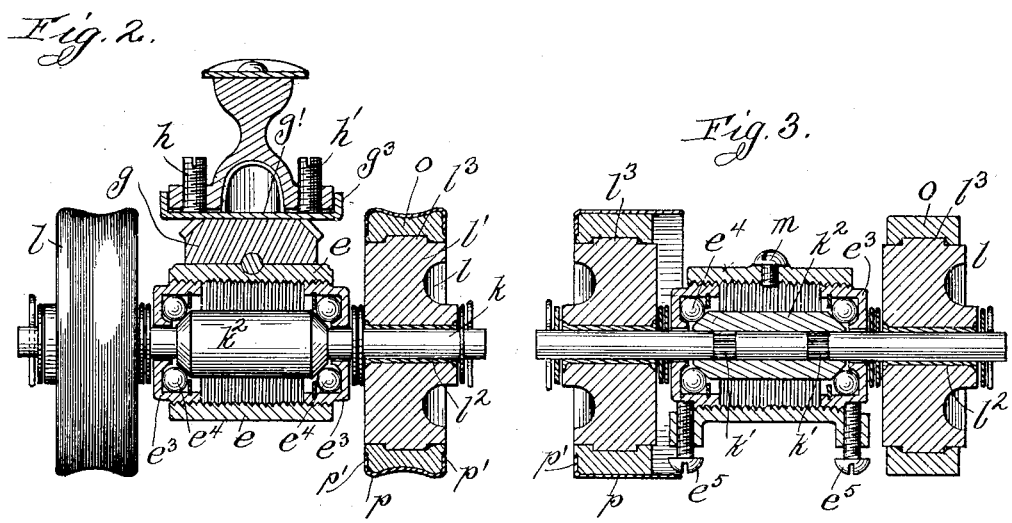
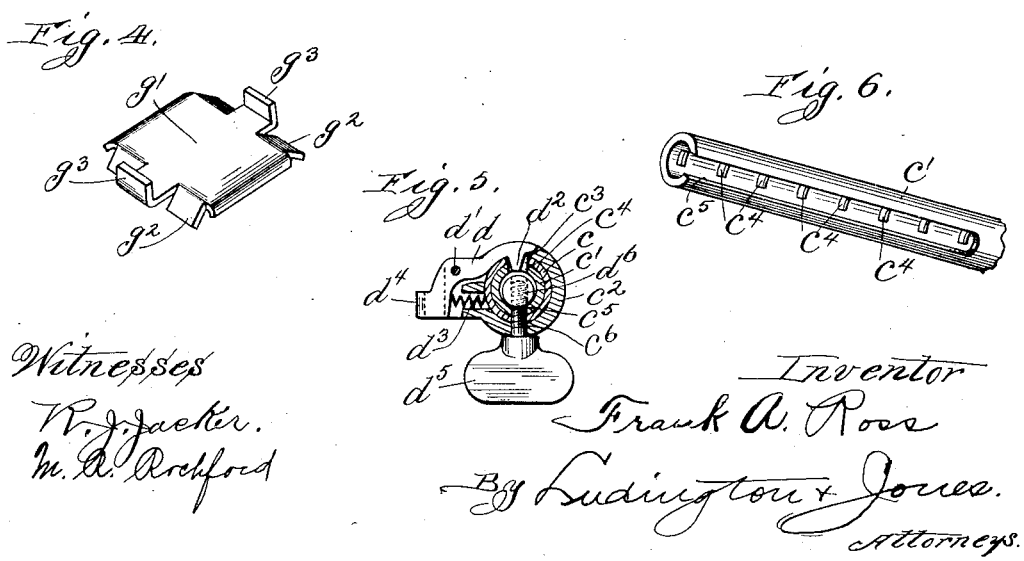
Witnesses
R. J. Jacker.
M. A. Rochford
Inventor
Frank A. Ross
By Ludington + Jones.
Attorneys.

UNITED STATES PATENT OFFICE.

FRANK A. ROSS, OF CHICAGO, ILLINOIS.

ROLLER-SKATE.

SPECIFICATION forming part of Letters Patent No. 657,790, dated September 11, 1900.

Application filed October 29, 1898. Serial No. 694,876. (No model.)

*To all whom it may concern:*

Be it known that I, FRANK A. ROSS, a citizen of the United States, residing at Chicago, in the county of Cook and State of Illinois, have invented a certain new and useful Improvement in Roller-Skates, of which the following is a full, clear, concise, and exact description, reference being had to the accompanying drawings, forming a part of this specification.

My invention relates to roller-skates, my object being to provide an improved form of adjustment for varying the length of the skates, and, further, to provide effective means for adjusting the tension of the rubber cushions of the skates. Furthermore, to provide an improved form of roller having a cushioned tire.

I have illustrated my invention in the accompanying drawings, in which—

Figure 1 is a view, partially in section, of a skate embodying my invention. Fig. 2 is a sectional view on line 2 2, Fig. 1. Fig. 3 is a sectional view on line 3 3, Fig. 1. Fig. 4 is a detailed view of the adjusting-plate for the cushion. Fig. 5 is a sectional view on line 5 5, Fig. 1. Fig. 6 is a detailed view of one of the tubes forming the connection between the front and rear portions of the skate.

Like letters refer to like parts in the several figures.

The toe-plate $a$ is mounted upon a bracket $b$, and the heel-plate $a'$ is mounted upon a similar bracket $b'$, the brackets being similar in form and construction. A tube $c$ is secured at the end to bracket $b$, and a tube $c'$, adapted to fit within the tube $c$, is secured at the end to bracket $b'$. The tube $c'$ carries upon the end a collar $c^2$, upon which is pivoted at $d'$ a lever $d$, carrying a lug or projection $d^2$, adapted to pass through an opening $c^3$ in the tube $c$ and to engage any one of a series of openings $c^4 c^4$, provided along the upper side of the inner tube $c'$. A coil-spring $d^3$ presses against the end of lever $d$ to hold the lug $d^2$ in position, a thumb-piece $d^4$ being provided upon said lever, whereby the same may be depressed against the tension of the spring to raise the projection $d^2$ out of the opening $c^4$, to thereby permit the inner tube to slide within the outer tube. The tube $c'$ carries at the lower side a slot $c^5$, and a hole $c^6$ is provided through the collar $c^2$ and the outer tube $c$, through which passes the shank of a thumb-screw $d^5$, the end of which screws into a cylindrical rod $d^6$ lying within the inner tube $c'$. The inner tube is moved within the outer tube to the desired position and the lug $d^2$ brought into engagement with the desired hole $c^4$ in the tube $c'$. The thumb-screw $d^5$ is then turned to clamp the tube $c'$ between the rod $d^6$ and the outer tube $c$, thus firmly locking the two tubes in position. By loosening the set-screw $d^5$ and pressing upon the lever $d$ at $d^4$ the outer and inner tubes may be moved into any desired position relatively, and then by releasing the lever and turning the thumb-screw $d^5$ the tubes may be firmly locked together.

The barrels $e$ $e$, within which the bearings for the rollers are mounted, are pivoted to the brackets by means of journal-pins $f f$, which pass through lugs $b^2 b^3$, provided in the bracket, and through lugs $e' e^2$, provided in the barrels $e$ $e$. Between the bracket and the barrel a rubber cushion $g$ is interposed, the cushion upon one side resting directly against the face of barrel $e$ and at the other side resting against a plate $g'$, having angular lugs $g^2$ $g^3$, which extend downward and overlap the edges of the cushion $g$ and having upwardly-extending lugs $g^3$ to engage the opposite face of the bracket, to thereby lock the cushion and the plate securely in position. Passing through tapped holes in the bracket adjusting-screws $h h'$ are provided, the ends of which rest against the plate $g$, whereby the plate may be adjusted in position to compress the cushion $g$, to thereby adjust the tension of the cushion. The screws $h h'$ are placed upon opposite sides of the bracket, so that they may be readily accessible for purposes of adjustment. The ends of the barrel $e$ are threaded, and cups $e^3 e^3$ are adapted to be screwed into the same, the balls $e^4 e^4$ of the bearing being interposed between said cups and conical shoulders provided upon the shaft $k$, upon which the rollers $l l$ are mounted. The shaft $k$ is knurled at several positions, as at $k' k'$, Fig. 3, and a sleeve or double cone $k^2$ is driven upon the shaft, being firmly held in position, due to the knurling of the shaft. The opposite ends of the sleeve form the shoulders of the shaft or axle $k$, against which the balls of the bearing are adapted to rest. In order to lock the cups $e^3 e^3$ in any adjusted position, set-screws $e^5 e^5$ are provided, adapted to engage the peripheries of said cups. An oil-hole is provided through the wall of the barrel $e$, adapted to be firmly sealed by screw $m$, whereby oil may be inserted in the barrel and find ready access to the ball-bearings.

The roller $l$ comprises a body portion $l'$, having a metallic sleeve $l^2$ inserted in the bore and having upon the periphery a ridge $l^3$. Surrounding this ridge is an annular body of rubber $o$, and surrounding this body of rubber is a metallic casing $p$, the casing having inwardly-extending flanges or rims $p'$, which engage the sides of the ring $o$. In forming the tire the rubber ring is first placed upon the body of the roller, as shown upon the right in Fig. 3, after which the casing $p$, having one flange $p'$ formed thereon, is placed in position, and then the other flange is formed, and during the formation of this flange the periphery of the casing is guttered to thus form a peripheral casing having a guttered tread, as shown in Fig. 2. The guttering of the tread produces several advantages. First, it compresses the rubber ring to securely lock the same between the body of the roller and the casing, and, in the second place, it affords a double tread for the roller and permits the roller to travel upon two narrow treads at opposite sides of the roller instead of upon a single broad tread, as would be the case if the casing were flat laterally or upon a single tread in the middle of the roller in case the tread is laterally convex. Furthermore, the double tread prevents sidewise slipping and facilities stopping, which is usually accomplished by sliding sidewise upon the skate.

It will be observed that by the present construction bodies of rubber are interposed between the rigid or non-elastic body and the respective flanges of the metallic casing. These bodies of rubber form cushions to yieldingly resist sidewise thrusts to which the casing is subjected. Moreover, by the relative positions of the rigid body and the flanges of the casing the flanges react against the rigid body when subjected to sidewise thrusts, tending to remove the casing sidewise, and this reaction holds the casing in position and prevents the same from slipping off.

Having described my invention, what I claim as new, and desire to secure by Letters Patent, is—

1. The combination with the front and rear portions of the skate, of the telescoping outer and inner tubes, the inner tube carrying a series of openings, a clamp for clamping said tubes together and a catch mounted on the outer tube and adapted to engage any one of said openings, substantially as described.

2. The combination with the front and rear portions of the skate, of the telescoping outer and inner tubes, a clamp for clamping said tubes together, the inner tube carrying a series of openings, a pivoted lever mounted upon the outer tube and adapted to engage any one of said openings, and a spring for pressing said lever into engagement with said openings, substantially as described.

3. The combination with the front and rear portions of the skate, of the telescoping outer and inner tubes, the inner tube carrying a longitudinal slot, a rod or part within said inner tube, and a set-screw passing through the outer tube and through said slot and screwing into said rod or part, substantially as described.

4. The combination with the front and rear portions of the skate, of the telescoping outer and inner tubes, the inner tube carrying a series of openings, a catch mounted on the outer tube and adapted to engage any one of said openings, said inner tube carrying a longitudinal slot, a rod or part within said inner tube, and a set-screw passing through the outer tube and said slot and screwing into said rod or part, substantially as described.

5. The combination with the body of the skate, of the barrel for the bearings pivoted thereto, a cushion of rubber interposed between the barrel and body, and a pair of adjusting-screws for varying the tension of the cushion, one situated on each side of said pivot whereby one or both ends of the cushion may be adjusted in tension, substantially as described.

6. In a cushion-roller for skates, a rigid cylindrical body, an annulus of rubber on the periphery thereof, a metallic casing surrounding said annulus and having flanges on the edges extending inward and having the inner edges of said flanges situated approximately opposite the outer periphery of the cylindrical body to leave portions of the rubber annulus between said body and the respective flanges to form cushions to resiliently resist the sidewise thrusts to which the metallic casing is subjected, substantially as described.

7. In a cushion-roller for skates, a non-elastic cylindrical body having a peripheral ridge, an annulus of rubber on the periphery thereof, and a metallic casing having flanges on the edges at right angles to the tread to engage the sides of the annulus, portions of the rubber annulus being interposed between said peripheral ridge and the respective flanges to form cushions to yieldingly resist sidewise thrusts to which the casing is subjected, substantially as described.

8. In a cushion-roller for skates, a non-elastic cylindrical body, an annulus of rubber on the periphery thereof, and a metallic casing having flanges on the edges to engage the sides of the annulus and having the medial portion of the periphery depressed to secure the annulus in position and form a guttered tread, substantially as described.

9. In a cushion-roller for skates, a non-elastic cylindrical body having a peripheral ridge, an annulus of rubber on the periphery thereof, and a metallic flanged casing having the medial portion of the periphery depressed to secure the annulus in position and form a guttered tread, substantially as described.

10. In a cushion-roller for skates, a rigid cylindrical body, an annulus of rubber on the periphery thereof, and a metallic casing surrounding said annulus and having inturned flanges on the edges which coöperate with the cylindrical body to prevent the sidewise displacement of the casing and annulus, substantially as described.

In witness whereof I have hereunto subscribed my name in the presence of two witnesses.

FRANK A. ROSS.

Witnesses:
W. CLYDE JONES,
M. R. ROCHFORD.